United States Patent
Killadi et al.

(10) Patent No.: US 9,588,850 B2
(45) Date of Patent: Mar. 7, 2017

(54) NETWORK CONTROLLER FAILOVER REQUEST TO REDUCE NETWORK OUTAGES

(71) Applicant: Aruba Networks, Inc., Sunnyvale, CA (US)

(72) Inventors: Srinivas Killadi, Bangalore (IN); Prakash Bhangavanth Shet, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 45 days.

(21) Appl. No.: 14/528,056

(22) Filed: Oct. 30, 2014

(65) Prior Publication Data

US 2016/0124819 A1 May 5, 2016

(51) Int. Cl.
| | |
|---|---|
| *G06F 11/00* | (2006.01) |
| *G06F 11/20* | (2006.01) |
| *H04L 29/08* | (2006.01) |
| *H04L 12/713* | (2013.01) |
| *H04L 12/24* | (2006.01) |
| *H04L 12/26* | (2006.01) |

(52) U.S. Cl.
CPC ...... *G06F 11/2005* (2013.01); *H04L 41/0663* (2013.01); *H04L 41/0836* (2013.01); *H04L 43/0817* (2013.01); *H04L 45/586* (2013.01); *H04L 67/10* (2013.01); *H04L 43/10* (2013.01)

(58) Field of Classification Search
CPC combination set(s) only.
See application file for complete search history.

(56) References Cited

U.S. PATENT DOCUMENTS

| | | | |
|---|---|---|---|
| 6,886,107 B2 * | 4/2005 | Walsh ................. | G06F 11/2005 714/4.12 |
| 7,010,715 B2 * | 3/2006 | Barbas ................ | G06F 11/2005 714/10 |
| 7,036,051 B1 * | 4/2006 | Fernandes ............... | H04L 45/00 714/43 |
| 2005/0010837 A1 * | 1/2005 | Gallagher ........... | G06F 11/2005 714/100 |
| 2008/0080365 A1 * | 4/2008 | Weeresinghe .......... | H04L 69/40 370/216 |

(Continued)

*Primary Examiner* — Amine Riad
(74) *Attorney, Agent, or Firm* — Brooks, Cameron & Huebsch, PLLC

(57) ABSTRACT

A system is described that includes a first network controller and a second network controller. The first controller operates as a master controller and the second controller operates as a standby controller for a set of access points. Using a set of VRRP advertisements between the first and second controllers, the second controller may (1) determine that the first controller has failed independent of any determination by the access points and (2) send a failover request to the access points. The failover request may cause the access points to use previously established tunnels between the second controller and each of the access points. By transmitting a failover request message from the second controller to the access points upon the detection by the second controller that the first controller has failed and independent of any determination by the access points, the system reduces network access downtime for the access points.

19 Claims, 4 Drawing Sheets

(56) References Cited

U.S. PATENT DOCUMENTS

| | | | | |
|---|---|---|---|---|
| 2011/0032816 A1* | 2/2011 | Isaksson | ............ | H04W 76/028 370/225 |
| 2013/0033978 A1* | 2/2013 | Eckert | .................... | H04L 45/16 370/216 |
| 2013/0343178 A1* | 12/2013 | Ankaiah | ............... | H04W 24/04 370/221 |
| 2014/0086042 A1* | 3/2014 | Van Gruenen | .......... | H04L 45/22 370/221 |

* cited by examiner

NETWORK CONTROLLER FAILOVER REQUEST TO REDUCE NETWORK OUTAGES

TECHNICAL FIELD

The present disclosure relates to the quick transition between master and standby controllers to reduce the duration of network outages for an access point following a failure of the master network controller. In particular, the standby network controller may transmit a failover request to the access point upon detecting that the master controller has failed and without waiting for the access point to determine that the master network controller has failed.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, access points may wirelessly associate with one or more client devices. These access points may establish tunnel connections via corresponding network controllers to provide network access to the one or more client devices. Accordingly, these access points and associated client devices rely on the network controllers to be active and operating correctly such that network access may be maintained for each access point and client device while in tunnel mode.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
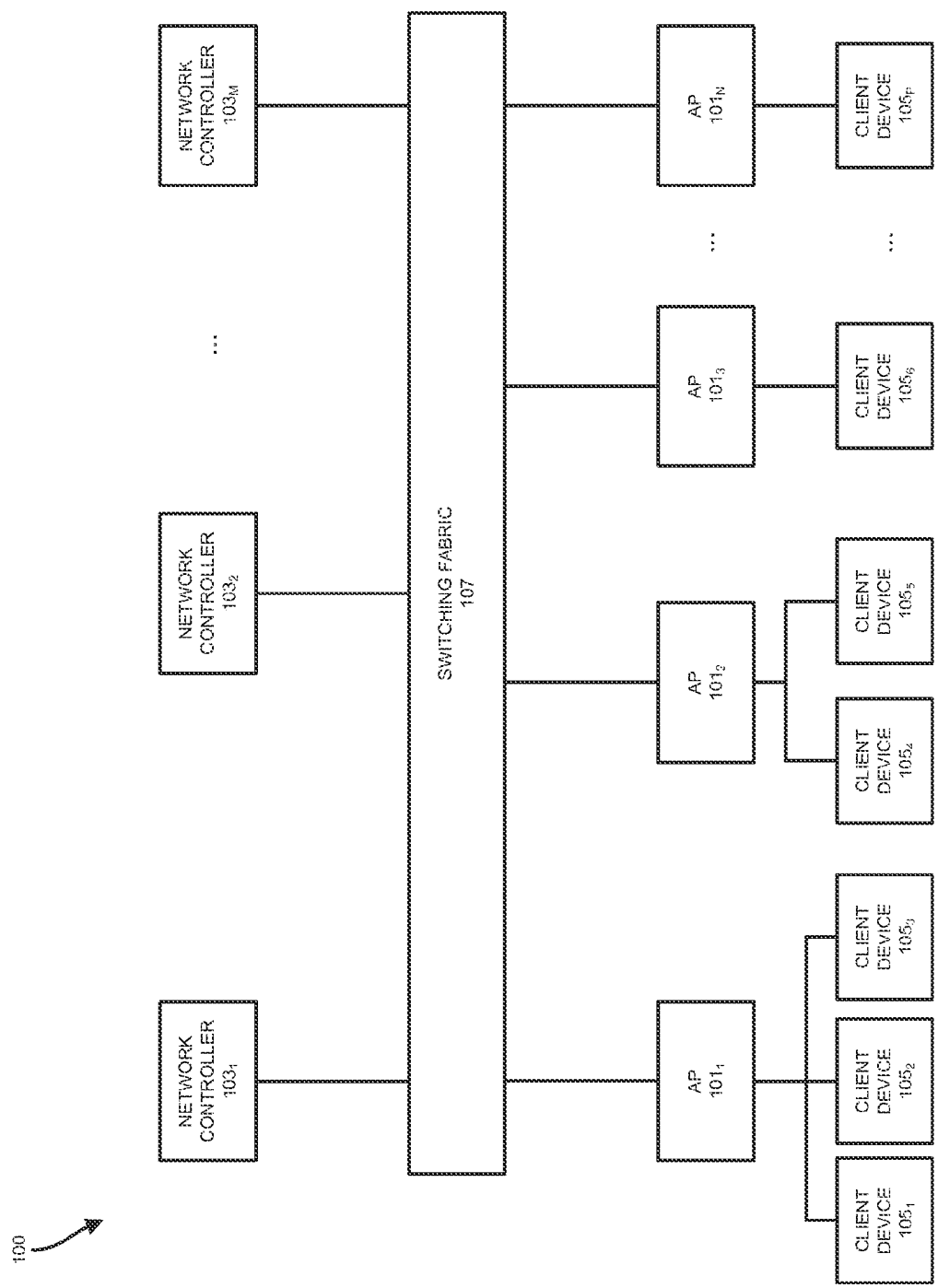
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The access points $101_1$-$101_N$ and the network controllers $103_1$-$103_M$ may be connected through the switching fabric 107 via wired and/or wireless connections. The client devices $105_1$-$105_P$ may be connected or otherwise associated with the access points $101_1$-$101_N$ through corresponding wireless connections.

The network system 100 may be installed/distributed in any region or area. For example, the access points $101_1$-$101_N$ may be installed in an office building or another similar structure. In some embodiments, the network controllers $103_1$-$103_M$ may provide tunneling mode capabilities for the client devices $105_1$-$105_P$. In this tunnel mode, data transmitted to/from the client devices $105_1$-$105_P$ and the access points $101_1$-$101_N$ may be encapsulated while transmitted over another network. These tunnel encapsulated data segments may be managed by the network controllers $103_1$-$103_M$ prior to forwarding to/from the client devices $105_1$-$105_P$ and the access points $101_1$-$101_N$. Accordingly, network access for the client devices $105_1$-$105_P$ and/or the access points $101_1$-$101_N$ may rely on corresponding network controllers $103_1$-$103_M$ being active and responsive.

In some embodiments, a master network controller $103_1$-$103_M$ may be assigned to an access point $101_1$-$101_N$ along with one or more standby network controllers $103_1$-$103_M$. The master network controller $103_1$-$103_M$ may be utilized by the access point $101_1$-$101_N$ until the master network controller $103_1$-$103_M$ fails or otherwise becomes unresponsive. Upon detecting the failure of the master network controller $103_1$-$103_M$, the network system 100 may cause one of the standby network controllers $103_1$-$103_M$ to transition to the role of master controller. As will be described in greater detail below, the network system 100 may ensure a quick transition between a master network controller $103_1$-$103_M$ and a standby network controller $103_1$-$103_M$ when the master network controller $103_1$-$103_M$ fails such that minimal network interruption is experienced by the access point $101_1$-$101_N$ and client devices $105_1$-$105_P$ associated with the access point $101_1$-$101_N$.

Each element of the network system 100 will now be described below by way of example. In one or more embodiments, the network system 100 may include more or less devices than the devices illustrated in FIG. 1, which may be connected to other devices within the network system 100 via wired and/or wireless mediums.

Figure 2:
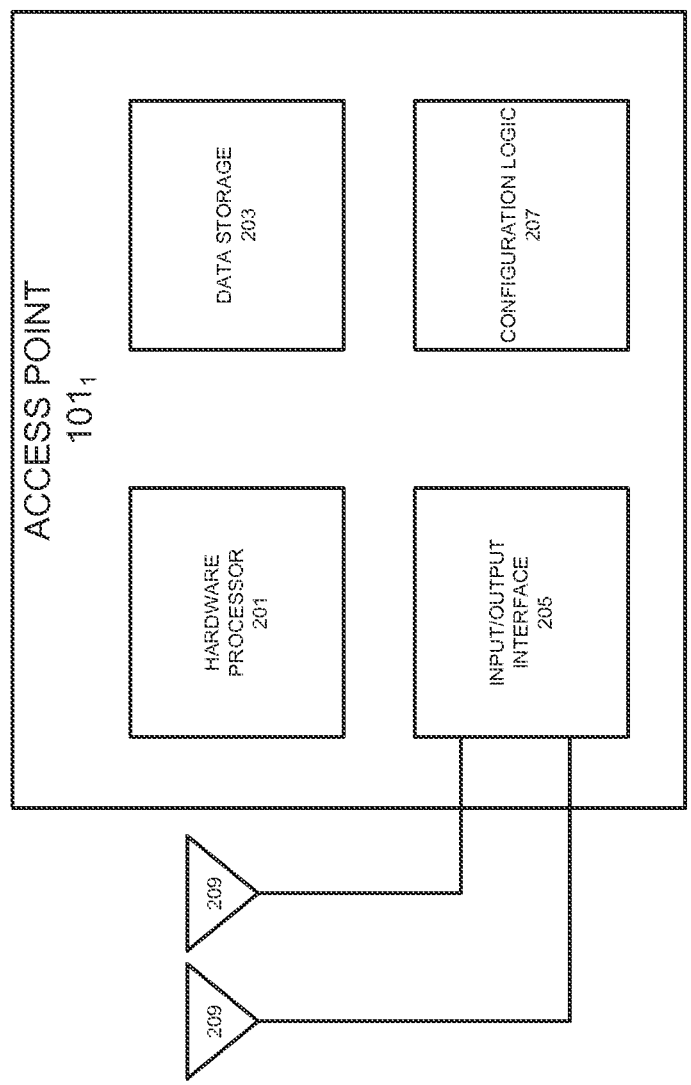
FIG. 2 shows a block diagram example of an access point in accordance with one or more embodiments.

The access points $101_1$-$101_N$ may be any device that can associate with the client devices $105_1$-$105_P$ to transmit and receive data over wireless channels. Each of the access points $101_1$-$101_N$ may operate on various wireless channels (i.e., frequency segments). In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_P$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100.

In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In one embodiment, the hardware processor 201 is coupled to the data storage 203 and the I/O interface 205. The hardware processor 201 may be any processing device including, but not limited to a Microprocessor with Interlocked Pipeline Stages (MIPS)/ARM-class processor, a microprocessor, a digital signal processor, an application specific integrated circuit, a microcontroller, a state machine, a field-programmable gate array (FPGA), or any type of similar type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to establish tunnels with one or more of the network controllers $103_1$-$103_M$ and/or transmit Virtual Router Redundancy Protocol (VRRP) advertisements (e.g., "Hello" messages) to one or more of the network controllers $103_1$-$103_M$.

As described above, the other access points $101_2$-$101_N$ may be similarly configured and designed as described above in relation to the access point $101_1$. For example, the access points $101_2$-$101_N$ may each comprise a hardware processor 201, data storage 203, an input/output (I/O) interface 205, and device configuration logic 207 in a similar fashion as described above in relation to the access point $101_1$.

In one embodiment, the client devices $105_1$-$105_P$ may be any wireless or wired electronic devices capable of receiving and transmitting data over wired and/or wireless mediums. For example, the client devices $105_1$-$105_P$ may be one or more of personal computers, laptop computers, netbook computers, wireless music players, portable telephone communication devices, smart phones, set-top boxes, tablet computers, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration and design of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

In one embodiment, the network controllers $103_1$-$103_M$ are digital devices that include a hardware processor, memory hierarchy, and input/output (I/O) interfaces including a wired and/or wireless interface such as an IEEE 802.3 interface.

In one embodiment, the configuration and design of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

In one embodiment, the network controllers $103_1$-$103_M$ may be any set of devices that assist the access points $101_1$-$101_N$ in performing network tasks and operations. For example, the network controllers $103_1$-$103_M$ may assist the access points $101_1$-$101_N$ in providing tunneling services to the client devices $105_1$-$105_P$. In some embodiments, the network controllers $103_1$-$103_M$ may provide redundancy to ensure that network access to the access points $101_1$-$101_N$ and the client devices $105_1$-$105_P$ is not severely impacted (e.g., network access is not lost/interrupted for an extended period of time) due to a network controller $103_1$-$103_M$ failure.

Figure 3:
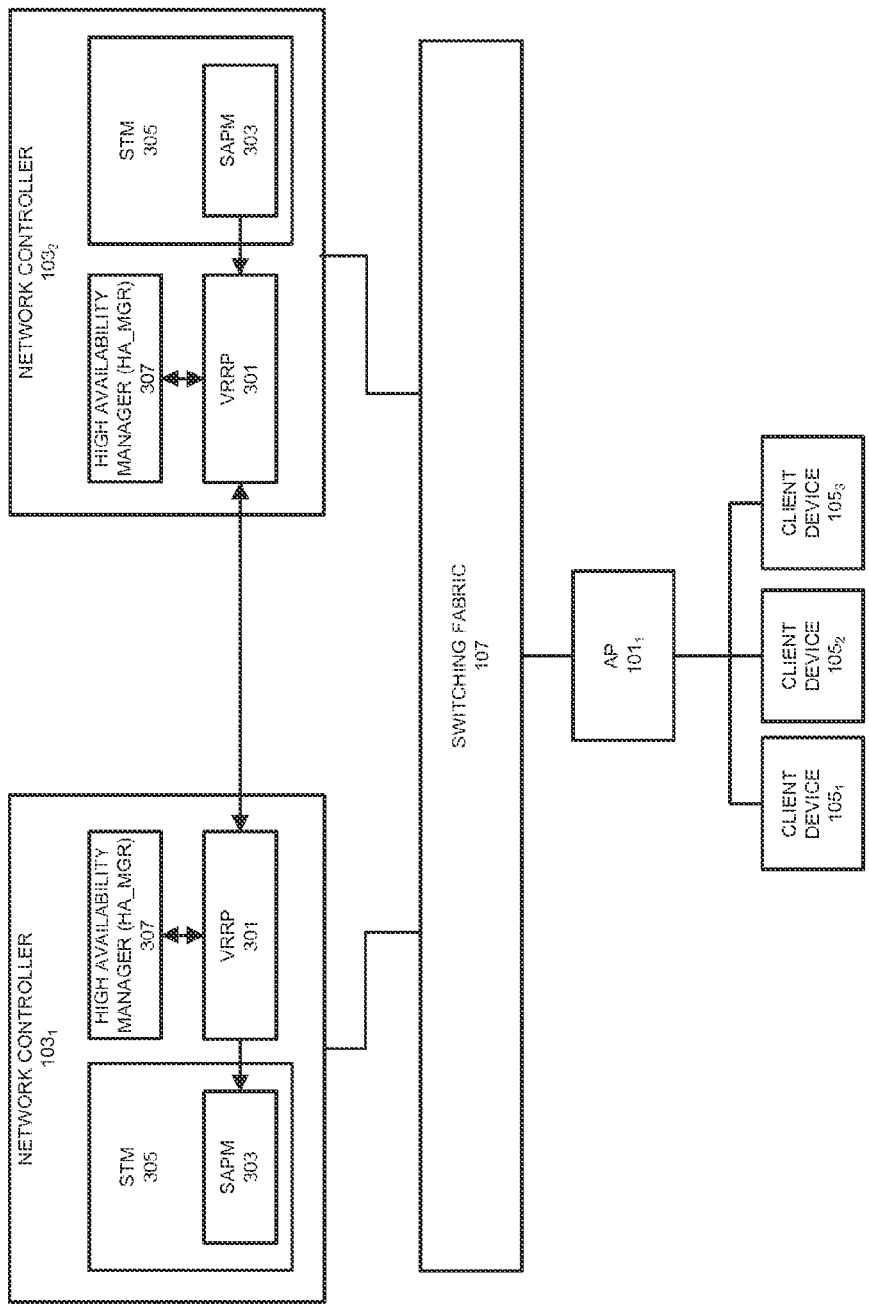
FIG. 3 shows communication between a set of network controllers and an access point according to one embodiment.

For example, as briefly described above, in some embodiments, master and standby network controllers $103_1$-$103_M$ may be assigned to a single access point $101_1$-$101_N$ or a single set of access points $101_1$-$101_N$ and corresponding client devices $105_1$-$105_P$. For instance, as shown in FIG. 3, the network controller $103_1$ may be assigned as the master network controller and the network controller $103_2$ may be assigned as the standby network controller for the access point $101_1$ and the client devices $105_1$-$105_3$, which are associated with the access point $101_1$. In this example, when the master network controller $103_1$ fails or is otherwise unresponsive, the standby network controller $103_2$ may assume the role and responsibilities of the master network controller $103_1$. These responsibilities may include, but are not limited to, providing tunneling services to the access point $101_1$ and the client devices $105_1$-$105_3$ associated with the access point $101_1$.

In one embodiment, this determination that the master network controller $103_1$ has failed may be facilitated using the VRRP. In this embodiment, a communication path may be established between the master network controller $103_1$ and the standby network controller $103_2$ as shown in FIG. 3. On this communication path, the master network controller $103_1$ and the standby network controller $103_2$ may share a common Internet Protocol (IP) address. This common IP address may be known as the VRRP_IP. Once VRRP is enabled on the master network controller $103_1$ and/or the standby network controller $103_2$, the master network controller $103_1$ may send a VRRP advertisement (e.g., a "hello" message) to the standby network controller $103_2$, which indicates that the master network controller $103_1$ owns the VRRP_IP. This ownership of the VRRP_IP will ensure that the standby network controller $103_1$ does not flip state from standby to master since the VRRP_IP can be owned by only one network controller 103. In one embodiment, this VRRP advertisement may be transmitted by the master network controller $103_1$ to the standby network controller $103_2$ every second (i.e., the VRRP Advertisement Interval set at default of one second).

VRRP 301 operating on the standby network controller $103_2$ may be used for determining the state of the master network controller $103_1$ based on these VRRP advertisements. For example, upon failing to receive VRRP advertisements from the master network controller $103_1$ for three consecutive seconds, VRRP 301 operating on the standby network controller $103_2$ may determine that the master network controller $103_1$ has failed or is otherwise unresponsive. VRRP 301 operating on the network controller $103_2$ may thereafter (1) begin sending VRRP advertisements to the network controller $103_1$ indicating that the network controller $103_2$ owns the VRRP_IP and consequently is the new master and (2) report this status to a service access point manager (SAPM) 303 running within a station management (STM) process 305 of the standby network controller $103_2$.

In one embodiment, a high availability manager 307 (i.e., HA_mgr) may be running on both the master network controller $103_1$ and the standby network controller $103_2$. In this embodiment, upon the access point $101_1$ connecting to the master network controller $103_1$ and setting up a set of corresponding tunnels, the high availability manager 307 running on the master network controller $103_1$ may pass the address (e.g., the Internet Protocol (IP) address) of the standby network controller $103_2$ to the access point $101_1$. The access point $101_1$ may use the address of the standby network controller $103_2$ provided by the master controller $103_1$ to establish tunnels between the access point $101_1$ and the standby network controller $103_2$. These tunnels between the access point $101_1$ and the standby network controller $103_2$ may remain inactive until the master network controller $103_1$ is determined to have failed based on communications using VRRP 301 as described above and heartbeats from the access point $101_1$.

For example, after VRRP 301 operating on the standby network controller $103_2$ reports a failure of the master network controller $103_1$ to the SAPM 303, the network controller $103_2$ may change role from standby controller to master controller (i.e., the network controller $103_2$ may take on the master role from the failed network controller $103_1$) as described above by taking ownership of the VRRP_IP. However, the new master network controller $103_2$ may not immediately activate tunnels between the network controller $103_2$ and the access point $101_1$. Instead, the activation of the tunnels between the network controller $103_2$ and the access point $101_1$ may await a failover request from the access point $101_1$ before this activation change is made.

In particular, the access point $101_1$ may transmit a series of heartbeat messages to each of the network controllers $103_1$ and $103_2$ using separate respective heartbeat tunnels. The heartbeats may be transmitted at one second intervals to each of the network controllers $103_1$ and $103_2$. Upon the access point $101_1$ failing to receive an acknowledgement in response to a predefined number of consecutively transmitted heartbeats, the access point $101_1$ may conclude that the non-responding controller $103_1$ has failed. For example, in one embodiment, the threshold may be set to eight heartbeats. In this example embodiment, upon failing to receive acknowledgments to eight consecutive heartbeats transmitted to the network controller $103_1$, the access point $101_1$ may conclude that the network controller $103_1$ has failed and in response may transmit a failover request to the network controller $103_2$.

Upon receiving the failover request, the network controller $103_2$, which previously determined that the network controller $103_1$ had failed using VRRP advertisements and switched roles by taking ownership of the VRRP_IP, may activate previously established tunnels between the access point $101_1$ and the network controller $103_2$. Accordingly, the network controller $103_2$ may now be fully activated as the master network controller for the access point $101_1$ and associated client devices $105_1$-$105_3$ following (1) the determination that the network controller $103_1$ has failed based on the lack of VRRP advertisements transmitted between the network controller $103_1$ and the network controller $103_2$ and (2) the determination that the network controller $103_1$ has failed using heartbeats from the access point $101_1$.

In this embodiment, the access point $101_1$ may experience longer than necessary network outages caused by the failed controller $103_1$ as a result of the requirement that both the access point $101_1$ and the network controller $103_2$ must jointly determine that the network controller $103_1$ has failed before transitioning to the network controller $103_2$. In particular, as shown above, the access point $101_1$ may only determine that the network controller $103_1$ has failed after the network controller $103_1$ fails to acknowledge eight heartbeats from the access point $101_1$. Since heartbeats from the access point $101_1$ are transmitted at one second intervals, the access point $101_1$ requires at least eight seconds to determine that the network controller $103_1$ has failed. In contrast, using VRRP advertisements between the network controllers $103_1$ and $103_2$, the network controller $103_2$ may determine that the network controller $103_1$ has failed after three seconds (i.e., failing to receive three VRRP advertisements from the network controller $103_1$). Thus, in this embodiment, the access point $101_1$ and associated client devices $105_1$-$105_3$ may not have network access in tunnel mode for five additional seconds following the network controller $103_2$ determining that the network controller $103_1$ has failed. Different techniques and processes are discussed below for overcoming/mitigating these inefficiencies to reduce network outages for access points $101_1$-$101_N$.

Network Controller Failover Request

Figure 4:
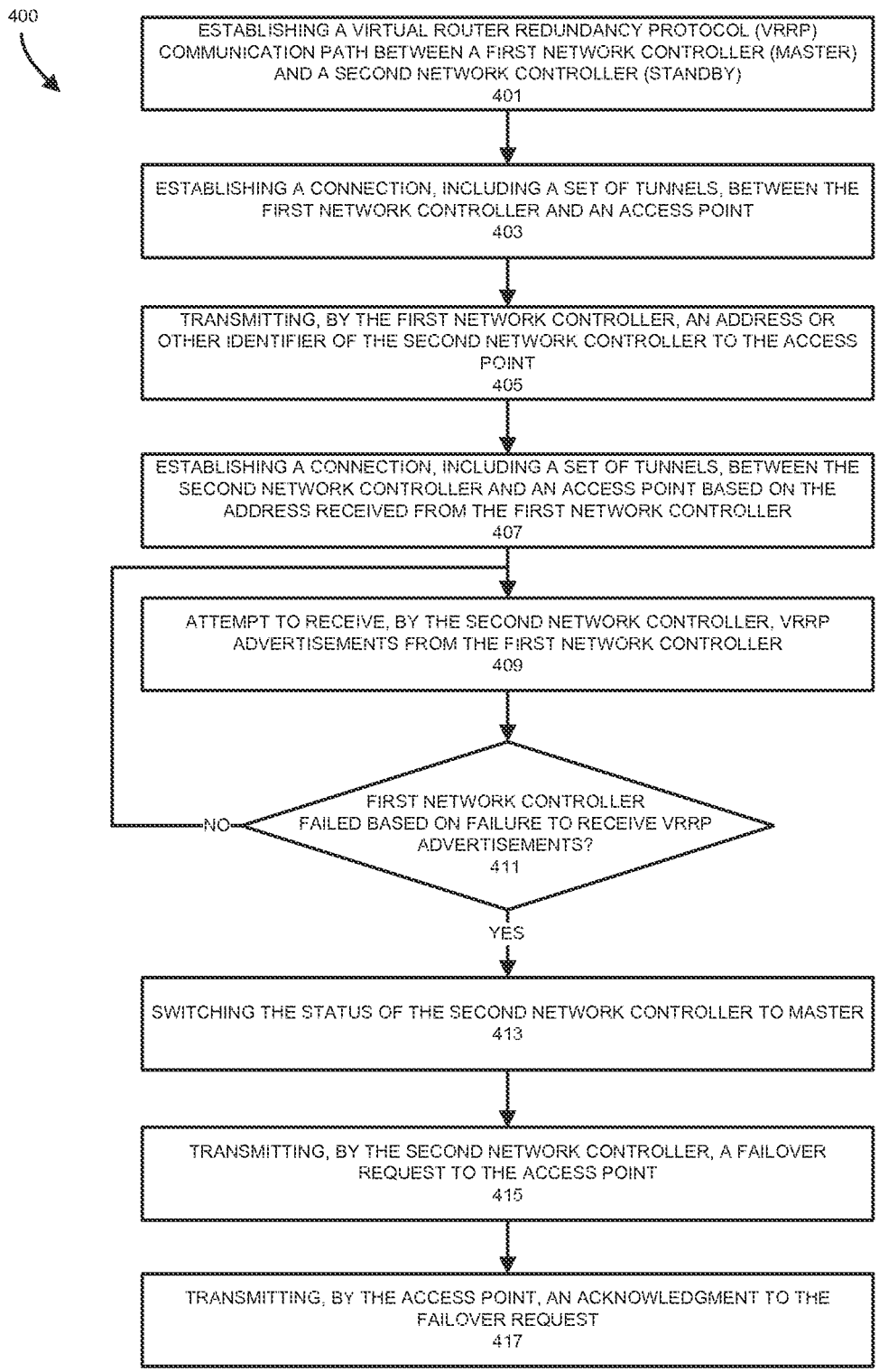
FIG. 4 shows a method according to one embodiment for intelligently and efficiently transitioning between a failed master network controller and a standby network controller to reduce network access downtime for one or more access points and associated client devices.

FIG. 4 shows a method 400 according to one embodiment for intelligently and efficiently transitioning between a failed master network controller $103_1$-$103_M$ and a standby network controller $103_1$-$103_M$ to reduce network access downtime for one or more access points $101_1$-$101_N$ and associated client devices $105_1$-$105_P$. The method 400 may be performed by one or more devices in the network system 100. For example, the method 400 may be performed by one or more of the network controllers $103_1$-$103_M$ in conjunction with one or more of the access points $101_1$-$101_N$. In one embodiment, one of the network controllers $103_1$-$103_M$ may be designated as a master network controller for a particular access point $101_1$-$101_N$ and another network controller $103_1$-$103_M$ may be designated as a standby network controller. In this embodiment, each of the operations of the method 400 may be performed by the standby network controller $103_1$-$103_M$.

Although each of the operations in the method 400 is shown and described in a particular order, in other embodiments, the operations of the method 400 may be performed in a different order. For example, although the operations of the method 400 are shown as being performed sequentially, in other embodiments the operations of the method 400 may be performed concurrently or during partially overlapping time periods.

The method 400 will be described in relation to the network controllers $103_1$ and $103_2$, which provide network access to the access point $101_1$ and the client devices $105_1$-$105_3$. However, in other embodiments, the method 400 may be performed for any combination and of network controllers $103_1$-$103_M$ that operate in a master-standby relationship to provide network access to access points $101_1$-$101_N$ and client devices $105_1$-$105_P$.

In one embodiment, the method 400 may commence at operation 401 with a Virtual Router Redundancy Protocol (VRRP) communication path being established between a first network controller $103_1$ and a second network controller $103_2$. The VRRP communication path allows the transmission of VRRP advertisements (e.g., hello messages) between the first network controller $103_1$ and the second network controller $103_2$ such that the first and second network controllers $103_1$/$103_2$ may determine the status of the other respective device (e.g., alive/responsive or failed/unresponsive). In one embodiment, the VRRP 301 on each of the network controllers $103_1$ and $103_2$ may communicate VRRP advertisements and establish/determine the status of the other device.

At operation 403 the access point $101_1$ may establish a connection with the first network controller $103_1$. In one embodiment, the network controller $103_1$ and the access point $101_1$ may establish one or more tunnels during this connection at operation 403. The tunnels may facilitate the transfer of data, including heartbeats and keep-alive messages, between the first network controller $103_1$ and the access point $101_1$. In one embodiment, the number of tunnels established at operation 403 may correspond to the number of virtual access points (VAPs) and/or radios operating on the access point $101_1$.

Following the establishment of a connection between the first network controller $103_1$ and the access point $101_1$, the network controller $103_1$ may transmit the address of a second network controller $103_2$ to the access point $101_1$ at operation 405. In this embodiment, the first network controller $103_1$ may be initially used by the access point $101_1$ as a master network controller while the second network controller $103_2$ may be assigned as a standby network controller. As will be described in greater detail below, upon the first network controller $103_1$ failing (i.e., not responding to messages transmitted from other network devices in the network system 100), the method 400 may assign the second network controller $103_2$ to the role of master. In one embodiment, the address transmitted between the first network controller $103_1$ and the access point $101_1$ at operation 403 may be an Internet Protocol (IP) address that is transmitted through a tunnel established at operation 403.

At operation 407, the access point $101_1$ may establish a set of tunnels with the second network controller $103_2$ based on the address received from the first network controller $103_1$ at operation 405. Similar to the tunnels established between the access point $101_1$ and the first network controller $103_1$ at operation 403, the tunnels established at operation 407 may facilitate the transfer of data, including heartbeats and keep-alive messages, between the second network controller $103_2$ and the access point $101_1$. Further, the number of tunnels established at operation 407 may correspond to the number of virtual access points (VAPs) and/or radios operating on the access point $101_1$. In one embodiment, the tunnels between the second network controller $103_2$ and the access point $101_1$ may be set to be inactive while the tunnels between the access point $101_1$ and the first network controller $103_1$ may be set to be active. Accordingly, the access point $101_1$ may initially utilize the first network controller $103_1$ to communicate in tunnel mode; however, as will be described in greater detail below, upon failure of the first network controller $103_1$, the tunnels established with the second network controller $103_2$ may be utilized for network access.

At operation 409, the second network controller $103_2$ may attempt to receive VRRP advertisements from the first network controller $103_1$. In particular, while properly operating, the first network controller $103_1$ may continually transmit VRRP advertisements to the network controller $103_2$ over the VRRP communication path established at operation 401 using VRRP 301. The messages transmitted from the first network controller $103_1$ to the second network controller $103_2$ may indicate that the first network controller $103_1$ is taking ownership of a shared VRRP_IP address and consequently is the master. Further, VRRP advertisements indicate that the transmitting network controller $103_1$ is operating properly. The VRRP advertisements may be transmitted at any interval, including one second intervals, two second intervals, etc. Accordingly, the second network controller $103_2$ may expect to receive VRRP advertisements at an established interval at operation 409.

At operation 411, the second network controller $103_2$ may determine if VRRP advertisements have been received from the first network controller $103_1$ during a threshold time period using VRRP 301. For instance, in some embodiments, the threshold time period may be three seconds. In one embodiment in which VRRP advertisements are transmitted at one second intervals, during a three second threshold time period, the second network controller $103_2$ could receive up to three VRRP advertisements from the first network controller $103_1$. Upon failing to receive any VRRP advertisements from the first network controller $103_1$ at operation 409 during the threshold time period, operation 411 may determine that the first network controller $103_1$ has failed or is otherwise unresponsive (i.e., is no longer able to transmit data). In this failed state, the network controller $103_1$ may not properly operate as a master controller for the access point $101_1$ and/or the client devices $105_1$-$105_3$. In particular, the failed network controller $103_1$ may be unable to transfer data in tunnel mode for the access point $101_1$ and/or the client devices $105_1$-$105_3$.

In response to receiving one or more VRRP advertisements during the threshold time period, the method 400 may return to operation 409. At operation 409, the network controller $103_2$ may continue to attempt to receive VRRP advertisements such that operation 411 may continue to determine the status of the network controller $103_1$.

Conversely, in response to not receiving VRRP advertisements during the predefined threshold time period and consequently determining that the first network controller $103_1$ has failed, VRRP 301 of the second network controller $103_2$ may switch the status of the second network controller $103_2$ from standby to master at operation 413. In one embodiment, this switch of status may be performed by the second network controller $103_2$ transmitting VRRP advertisements over the VRRP communication path established at operation 401. These VRRP advertisements indicate that the second network controller $103_2$ (1) is taking ownership of the VRRP_IP address and thus is now the master and (2) is operating properly. Accordingly, after the first network controller $103_1$ has failed, the second network controller $103_2$ may takeover master status for the access point $101_1$ and/or the client devices $105_1$-$105_3$ at operation 413 using VRRP 301. Immediately after or concurrent with the change of status at operation 413, the second network controller $103_2$ may transmit a failover request to the access point $101_1$ at operation 415. The failover request transmitted from the second network controller $103_2$ informs the access point $101_1$ that the second network controller $103_2$ will now be operating as the master controller.

In response to the failover request, the access point $101_1$ may transmit an acknowledgment (ACK) message to the second network controller $103_2$ at operation 417. In some embodiments, the second network controller $103_2$ may retransmit the failover request to the access point $101_1$ upon failing to receive an acknowledgment message. Upon receipt of the acknowledgment message from the access point $101_1$, the second network controller $103_2$ may activate the tunnels between the access point $101_1$ and the second network controller $103_2$, which were established at operation 407, using the high availability manager 307. Accordingly, with the transfer of status at operation 413 and the activation of the tunnels at operation 417 the second network controller $103_2$ may now entirely operate as the master network controller for the access point $101_1$ and/or the client devices $105_1$-$105_3$. In particular, the new master network controller $103_2$ may facilitate tunnel operations for the access point $101_1$ and/or the client devices $105_1$-$105_3$ just as the network controller $103_1$ previously did.

By transmitting a failover request message from the second network controller $103_2$ to the access point $101_1$ upon the detection by the second network controller $103_2$ that the first network controller $103_1$ has failed, the method 400 reduces network access downtime for the access point $101_1$ and/or the client devices $105_1$-$105_3$. In particular, although the access point $101_1$ may transmit heartbeat messages to the network controller $103_1$ to determine the status of this device (i.e., determine whether the network controller $103_1$ has failed or is otherwise non-responsive), the method 400 does not wait or rely on this determination before initiating a role transfer between the first network controller $103_1$ and the second network controller $103_2$ (i.e., transfer of master role). Since the status determination made by the access point $101_1$ may take longer than the status determination made by the controller $103_2$, by not relying on this longer determination the method 400 reduces the time before a role transfer may be initiated. For example, the access point $101_1$ may require eight consecutive unacknowledged heartbeats that are each separated by one second before indicating a network controller $103_1$ failure while the network controller $103_2$ may only require failure to receive three VRRP advertisements each separated by a second from the network controller $103_2$ before indicating a network controller $103_1$ failure. By reducing the time period before triggering a role transition between the failed first network controller $103_1$ and the operating second network controller $103_2$, the method 400 reduces network access down time for the access point $101_1$ and/or the associated client devices $105_1$-$105_3$ while operating in a tunnel mode.

Although described in relation to a single access point $101_1$ associated with the first and second network controllers $103_1$ and $103_2$, which respectively function as master and standby controllers, in other embodiments the method 400 may operate in relation to multiple access point 101₁-101ₙ. In particular, the first and second network controllers 103₁ and 103₂ may simultaneously operate as master and standby for two or more of the access points 101₁-101ₙ. In this embodiment, the failover request transmitted at operation 415 may be sent from the second network controller 103₁ to each of the access points 101₁-101ₙ connected to the failed first network controller 103₁. In this fashion, the method 400 may efficiently operate to transition between a failed master network controller 103₁-103ₘ and a standby network controller 103₁-103ₘ to reduce network access downtime for multiple more access points 101₁-101ₙ and associated client devices 105₁-105ₚ.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   identifying a particular set of one or more devices obtaining services from a first network device and a second network device;
   detecting failure of the first network device in response to a lack of virtual router redundancy protocol (VRRP) advertisements being received by second network device from the first network device;
   responsive to detecting that the first network device has failed:
      transmitting a failover request message to each of the particular set of devices indicating to obtain the services from the second network device; and
      connecting at least one of the particular set of devices to the second network device to obtain the services in response to receiving an acknowledgment that the at least one of the particular set of devices received the failover request message.

2. The medium of claim 1, wherein transmitting the failover request message to each of the particular set of devices is performed prior to at least one of the particular set of devices determining that the first network device has failed.

3. The medium of claim 1, wherein transmitting the failover request message to each of the particular set of devices is performed prior to at least one of the particular set of devices determining, via heartbeat messages between the particular set of devices and the first network device, that the first network device has failed.

4. The medium of claim 1, comprising detecting virtual router redundancy protocol (VRRP) advertisements being transmitted from the first network device to a second network device prior to detection of the failure.

5. The medium of claim 1, wherein, prior to the detection of the failure:
   the first network device is a master network device and the second network device is a standby network device; and
   active data tunnels are established between the first network device and the particular set of one or more devices and inactive data tunnels are established between the second network device and the particulare set of one or more devices.

6. The medium of claim 5, wherein, in response to receiving the acknowledgment by the second device, the first network device is the standby network device and the second network device is the master network device.

7. The medium of claim 1, wherein connecting at least one of the particular set of devices to the second network device comprises activating communication tunnels between the particular set of devices and the second network device.

8. The medium of claim 7, wherein the communication tunnels between the particular set of devices and the second network device are established in a dormant state prior to the detecting operation.

9. The medium of claim 1, wherein detecting failure of the first network device is performed through the failure to receive the VRRP advertisements from the first network device during a prescribed time period.

10. A system comprising:
    at least one device including a hardware processor;
    the system is configured to perform operations comprising:
       identifying a particular set of one or more devices obtaining services from a first network device and a second network device;
       detecting failure of the first network device in response to a lack of virtual router redundancy protocol (VRRP) advertisements being received by the second network device from the first network device;
       responsive to detecting that the first network device has failed:
          transmitting a failover request message to each of the particular set of devices indicating to obtain the services from the second network device; and
          connecting at least one of the particular set of devices to the second network device to obtain the services in response to receiving an acknowledgment that the at least one of the particular set of devices received the failover request message.

11. The system of claim 10, wherein transmitting the failover request message to each of the particular set of devices is performed prior to at least one of the particular set of devices determining that the first network device has failed.

12. The system of claim 10, wherein transmitting the failover request message to each of the particular set of devices is performed prior to at least one of the particular set of devices determining, via heartbeat messages between the particular set of devices and the first network device, that the first network device has failed.

13. The system of claim 10, wherein the operations are performed by the second network device.

14. The system of claim 10, wherein the first network device and the second network device are controllers, and wherein each of the particular set of devices are access points.

15. The system of claim 10, wherein the failover request message transmitted to each of the particular set of devices comprises a Failover Request.

16. The system of claim 10, wherein causing the particular set of devices to connect to the second network device comprises activating communication tunnels between the particular set of devices and the second network device.

17. The medium of claim 16, wherein the communication tunnels between the particular set of devices and the second network device are established in a dormant state prior to the detecting operation.

18. The system of claim 10, wherein the acknowledgment is indicated by receiving an Acknowledgement message from each of the particular set of devices.

19. The system of claim 10, wherein detecting failure of the first network device is performed through the failure to receive heartbeat messages from the first network device to the second network device during a prescribed time period.

* * * * *